(12) United States Patent (10) Patent No.: US 8,451,830 B2
Sul (45) Date of Patent: May 28, 2013

(54) SYSTEM AND METHOD FOR MEASURING QUALITY OF MULTIMEDIA SERVICE

(75) Inventor: Sang Dong Sul, Seoul (KR)

(73) Assignee: Borasys, Inc., Seoul (KR)

( * ) Notice: Subject to any disclaimer, the term of this patent is extended or adjusted under 35 U.S.C. 154(b) by 0 days.

(21) Appl. No.: 13/533,926

(22) Filed: Jun. 26, 2012

(65) Prior Publication Data

US 2013/0044620 A1 Feb. 21, 2013

(30) Foreign Application Priority Data

Aug. 17, 2011 (KR) ........................ 10-2011-0081871

(51) Int. Cl.
*H04L 12/28* (2006.01)

(52) U.S. Cl.
USPC ............................ 370/356; 370/252; 370/224

(58) Field of Classification Search
USPC ................. 370/252, 216, 235, 229, 241, 242, 370/241.1, 253, 464, 465, 467, 469, 471, 370/352, 353, 356, 224
See application file for complete search history.

(56) References Cited

U.S. PATENT DOCUMENTS

2008/0049738 A1* 2/2008 Joung et al. ................... 370/356
2009/0268713 A1* 10/2009 Ottur et al. .................... 370/352

FOREIGN PATENT DOCUMENTS

KR 10-0792374 B1 1/2008

OTHER PUBLICATIONS

The Office action dated Sep. 27, 2011 from the KR application No. 10-2011-0081871, issued by KIPO. (The English translation of the Office action is submitted herewith.)

* cited by examiner

*Primary Examiner* — Dady Chery
(74) *Attorney, Agent, or Firm* — The PL Law Group, PLLC

(57) ABSTRACT

A system and a method for measuring quality of a multimedia service transceived via a VoIP service and notifying a user of a result of the measurement are disclosed. An embodiment of the present invention includes a VoIP multimedia server configured to loop back sample multimedia data received from a multimedia terminal providing a VoIP multimedia service, analyze a quality measurement result received from the multimedia terminal, calculate a quality measurement score, convert the quality measurement score into voice data, and transmit the voice data to the multimedia terminal, and a multimedia terminal configured to transmit the sample multimedia data to the VoIP multimedia server via a packet network, measure the quality of loopback sample multimedia data looped back from the VoIP multimedia server, transmit the quality measurement result to the VoIP multimedia server, receive the voice data of the quality measurement score, and output a voice.

10 Claims, 5 Drawing Sheets

SYSTEM AND METHOD FOR MEASURING QUALITY OF MULTIMEDIA SERVICE

CROSS-REFERENCE TO RELATED APPLICATIONS

This U.S. non-provisional patent application claims priority under 35 U.S.C. §119 of Korean Patent Application No. 10-2011-0081871, filed on Aug. 17, 2011, the entire contents of which are hereby incorporated by reference.

BACKGROUND

1. Field

The present invention disclosed herein relates to a system and method for measuring quality of a multimedia service of a packet network.

2. Description of the Related Art

In order to provide a service in a packet network, multimedia data such as voice data and image data are IP (Internet Protocol)-packetized to be transmitted through the Internet by using a residential access network such as an xDSL network and cable network constructed for providing an Internet service or an enterprise access network through a dedicated line. The packet network service such as the VoIP (Voice over Internet Protocol) service was originally used for a voice call via an IP network which is a data communication packet network, but is currently used for providing a multimedia service including not only a voice but also an image.

The VoIP, which provides the multimedia service by using the packet network such as the Internet, is limited in terms of quality due to bandwidth limitation and packet loss of the Internet.

That is, since IP-packetized multimedia data (voice data and image data) share network resources with typical data flowing through the Internet, data loss, the excessive transmission delay, or the non-sequential and irregular packet arrival may occur when congestion of the typical data occurs or when network quality is degraded. Particularly, since an RTP (Real-time Transport Protocol) packet is loaded not on a TCP (Transmission Control Protocol) with connectivity but on a UDP (User Datagram Protocol) with non-connectivity so as to be transmitted, excessive packet loss may easily occur. Therefore, in order to secure the quality of the multimedia such as the voice call, the VoIP service using the Internet is required to transmit the multimedia data more in real time in comparison with typical data transmission which requires integrity. Accordingly, due to limitation of the Internet with respect to real time transmission, quality degradation has become an important issue.

A VoIP service provider needs to continuously measure and analyze the multimedia quality in order to secure valid multimedia quality for a service user, thereby preventing the multimedia quality degradation and satisfying the user.

Particularly, since the VoIP service uses a floating line unlike a PSTN (Public Switched Telephone Network) which uses a dedicated line, considerable packet loss and delay may highly possibly occur according to the Internet traffic. Therefore, quality of service (QoS) of the VoIP service is inferior to that of the PSTN. Accordingly, it is strongly required to correctly measure the multimedia quality.

To this end, various Korean Patent Applications, e.g., Korean Patent Application Laid-open Publication No. 2007-0060861, propose various technologies for measuring the multimedia quality in the VoIP service network.

However, according to typical devices for measuring the multimedia quality in the VoIP network, a probe is installed on a location being subjected to measurement in order to collect data, or an empty port of a hub such as a switch or router of a network device is used as a mirroring port in order to collect data. That is, the VoIP network quality is manually measured. Thus, additional measuring equipment, which costs high, is required.

Further, the additional measuring equipment should be always carried, and an additional linkage function should be implemented in order to transmit the measurement result to an external server. Further, a terminal for measuring the quality of the multimedia data including the voice and image data is not provided. Moreover, when the quality is degraded, a troubled section cannot be detected.

SUMMARY

An aspect of the present invention is to provide a method for measuring quality of a multimedia service in a packet network in which data are transceived for a VoIP service.

Another aspect of the present invention is to enable a user of a multimedia terminal such as a smartphone to easily know a measurement result.

Another aspect of the present invention is to correctly measure quality of a multimedia service without expense.

Embodiments of the present invention provide multimedia service quality measuring systems including a VoIP multimedia server configured to loop back sample multimedia data received from a multimedia terminal providing a VoIP multimedia service, analyze a quality measurement result received from the multimedia terminal, calculate a quality measurement score, convert the quality measurement score into voice data, and transmit the voice data to the multimedia terminal, and a multimedia terminal configured to transmit the sample multimedia data to the VoIP multimedia server via a packet network, measure the quality of loopback sample multimedia data looped back from the VoIP multimedia server, transmit the quality measurement result to the VoIP multimedia server, receive the voice data of the quality measurement score, and output a voice.

In some embodiments, the VoIP multimedia server 200 may include a packet network access unit configured to perform transmitting and receiving operations for the packet network, a loopback processing unit configured to receive the sample multimedia data from the multimedia terminal via the packet network and transmit, to the multimedia terminal, the loopback sample multimedia data obtained by looping back the sample multimedia data received, a voice score transmission unit configured to convert the quality measurement result received from the multimedia terminal into the quality measurement score, convert the quality measurement score into the voice data, and transmit the voice data to the multimedia terminal, and a voice conversion unit configured to convert the quality measurement score into the voice data and provide the voice data to the voice score transmission unit.

In other embodiments, the multimedia terminal may include an RF unit configured to increase/decrease and amplify a frequency transceived, a data processing unit configured to modulate and demodulate a signal transceived through the RF unit in a format of packet data, a multimedia processing unit configured to convert the packet data transceived through the data processing unit into multimedia data, a sample multimedia database configured to store the sample multimedia data, a multimedia quality measuring application configured to, in response to a quality measurement request, transmit the sample multimedia data to the VoIP multimedia server via the packet network, measure the quality of the loopback sample multimedia data looped back, transmit the quality measurement result to the VoIP multimedia server, and output the voice data of the quality measurement score received from the VoIP multimedia server, and a memory in which the multimedia quality measuring application is installed.

In other embodiments of the present invention, multimedia service quality measuring methods include connecting a call to a VoIP multimedia server connected to a packet network by driving a multimedia quality measuring application by using a multimedia terminal, transmitting sample multimedia data to the VoIP multimedia server by using the multimedia terminal, transmitting loopback sample multimedia data obtained by looping back the sample multimedia data to the multimedia terminal by using the VoIP multimedia server, measuring quality of the loopback sample multimedia data and transmitting a result of the quality measurement to the VoIP multimedia server by using the multimedia terminal, analyzing the quality measurement result, calculating a quality measurement score, converting the quality measurement score into voice data, and transmitting the voice data to the multimedia terminal by using the VoIP multimedia server, and outputting the quality measurement score represented by the voice data as a voice by using the multimedia terminal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF EXEMPLARY EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
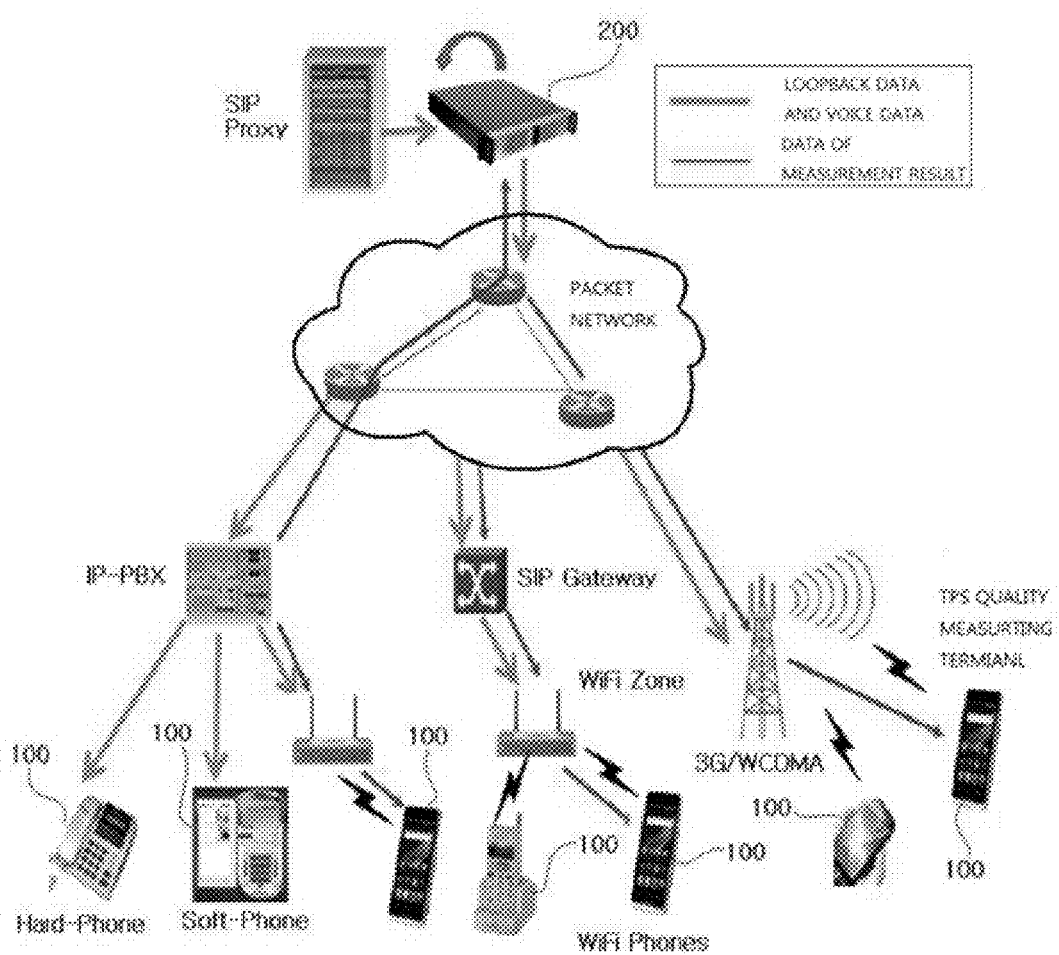
FIG. 1 is a diagram illustrating a multimedia service quality measuring system according to an embodiment of the present invention.
Figure 2:
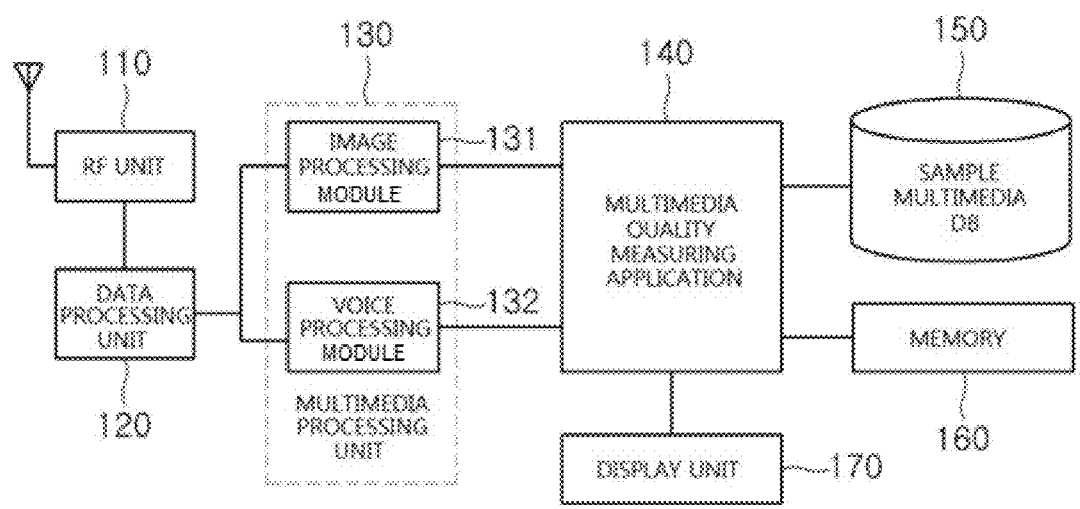
FIG. 2 is a block diagram illustrating an internal structure of a multimedia terminal according to an embodiment of the present invention.
Figure 3:
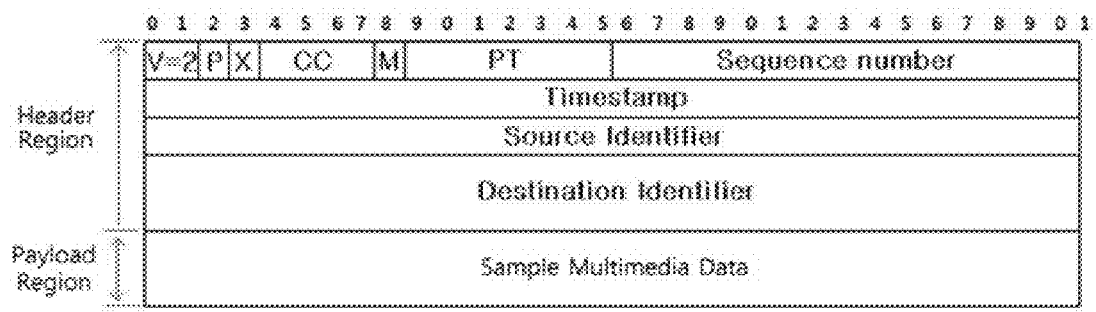
FIG. 3 is a diagram illustrating a real-time transport protocol (RTP) packet according to an embodiment of the present invention.
Figure 4:
FIG. 4 is a diagram exemplarily illustrating a display of quality measurement result received from a VoIP multimedia server.

FIG. 1 is a diagram illustrating a multimedia service quality measuring system according to an embodiment of the present invention, FIG. 2 is a block diagram illustrating an internal structure of a multimedia terminal according to an embodiment of the present invention, FIG. 3 is a diagram illustrating a real-time transport protocol (RTP) packet according to an embodiment of the present invention, and FIG. 4 is a diagram exemplarily illustrating a display of quality measurement result received from a VoIP multimedia server.

The multimedia service quality measuring system allows multimedia terminals 100 to transmit multimedia data including voice data and image data in the format of a packet to one another via a VoIP gateway connected to a session initiation protocol (SIP) network, an Internet protocol (IP) network, and a code division multiple access (CDMA) network by using an IP technology to thereby perform a multimedia packet call.

The multimedia service quality measuring system of an embodiment of the present invention includes a multimedia terminal 100 which communicates multimedia data via a packet network (VoIP network), and a VoIP multimedia server 200 which measures quality of the multimedia data transmitted from the multimedia terminal 100.

That is, the multimedia terminal 100 transmits sample multimedia data to the VoIP multimedia server 200 via the packet network, measures quality of loopback sample multimedia data looped back from the VoIP multimedia server 200 to transmit a result of the measurement to the VoIP multimedia server 200, and receives voice data of a quality measurement score to output a voice.

The VoIP multimedia server 200 loops back the sample multimedia data received from the multimedia terminal 100 provided with a VoIP multimedia service, analyzes the quality measurement result received from the multimedia terminal 100 to calculate the quality measurement score, and converts the quality measurement score into the voice data to transmit the voice data to the multimedia terminal 100.

The multimedia terminal 100, e.g., a smartphone which is used at home or work, is capable of making a voice or video call in the Internet or intranet by using an IP according to a VoIP protocol. The multimedia terminal 100 is not limited thereto. Any terminal capable of processing VoIP, e.g., a Wi-Fi phone or business/household IP phone, may be used. The multimedia terminal 100 is connected to the VoIP network via Wi-Fi or CDMA network.

Referring to FIG. 2, the multimedia terminal 100 includes an RF unit 110, a data processing unit 120, a multimedia processing unit 130, a memory 160, a display unit 170, a multimedia quality measuring application 140, and a sample multimedia database 150. A feature phone, a smartphone, and a cellular phone performing wireless communication will be described as examples of the multimedia terminal 100.

The RF unit 110 performs a wireless communication function of the terminal. The RF unit 110 includes an RF transmitter which increases a frequency of a signal being transmitted and amplifies the signal being transmitted, and an RF receiver which low-noise amplifies a received signal and decreases a frequency thereof.

The data processing unit 120 includes a transmitter which encodes and modulates a signal being transmitted, and a receiver which decodes and demodulates a received signal. For example, the data processing unit 120 may include a modem and codec. Herein, the codec includes a data codec for processing packet data and a voice codec for processing a signal of a voice.

The multimedia processing unit 130 converts packet data processed and extracted by the data processing unit 120 into multimedia data such as voice data and image data in order to perform a data input/output function. For instance, in the case of using the VoIP network service, the packet data extracted by the data processing unit 120 are restored to voice data or image data. To this end, the multimedia processing unit includes an image processing module 131 and a voice processing module 132.

The voice processing module 132 reproduces a voice signal received from the voice codec of the data processing unit 120 through a speaker, or transmits a voice signal generated from a microphone to the voice codec of the data processing unit 120.

The image processing module 131 generates screen data for displaying an image signal outputted from a camera sensor. The image processing module 131 processes the image signal outputted from the camera sensor on a frame basis, and outputs frame image data according to characteristics and size of an LCD. The image processing module 131 has an image codec to compress the frame image data displayed on a display unit 170 of the LCD according to a set scheme or to restore the compressed frame image data to the original frame image data. Herein, the image codec may be a JPEG codec, an MPEG4 codec, or a wavelet codec, but is not limited thereto.

The memory 160 includes a program memory and a data memory. In the program memory, a booting program and an operating system (OS) for controlling general operations of a mobile communication terminal are included. In the data memory, various data generated while the mobile communication terminal is operated are stored. The memory 160 is a module capable of inputting/outputting information, e.g., a flash memory, a compact flash (CF) card, a secure digital (SD) card, a smart media (SM) card, a multi-media card (MMC), or a memory stick. The memory 160 may be included in a mobile communication device or may be provided to an additional device. The multimedia quality measuring application is stored in the memory 160.

A control unit (not illustrated) is under control of the OS to control overall operations of the multimedia terminal 100. The control unit controls operations of elements of the terminal such as operations of voice call, multimedia communication, and camera.

In the sample multimedia DB 150, a plurality of sample multimedia data, i.e., sample voice data and sample image data, used for the multimedia quality measurement are stored. A unique identification number is stored for each piece of sample multimedia data. The sample multimedia data are loaded on the RTP packet to be transmitted to the VoIP multimedia server 200 when the quality is measured, and the quality of the loopback sample multimedia data looped back therefrom is measured. That is, by comparing the sample multimedia data transmitted from the multimedia terminal 100 with the loopback sample multimedia data looped back from the server, the quality of the VoIP network is measured.

The multimedia quality measuring application 140, which is a quality measuring program installed in the memory 160, may be downloaded from a market to be installed. When the multimedia quality measuring application 140 is loaded to perform a quality measuring operation, the multimedia quality measuring application 140 loads the sample multimedia data stored in the sample multimedia DB on the RTP packet to transmit the packet to the VoIP multimedia server 200.

The RTP packet is a transport layer protocol packet for transmitting streaming traffic of a voice or video through the Internet. The RTP packet is suitable for transmitting data in real time for a multimedia service such as VoD, AoD, or VoIP.

FIG. 3 is a diagram illustrating the RTP packet. In a header region of the RTP packet, header information of the packet is included, e.g., a sequence number, a source identifier, and a destination identifier are included. A unique serial number of a corresponding packet is included in the sequence number, and a transmission time is included in a time stamp. These pieces of information are used later when a packet loss ratio or delay ratio is measured. The source identifier corresponds to an IP address of the multimedia terminal 100, and the destination identifier corresponds to an IP address of the VoIP multimedia server 200 for receiving the RTP packet.

In a payload region, the sample multimedia data which are to be used for measuring voice quality of the VoIP network are included. In the case where the sample multimedia data are voice data, a voice of a caller is sampled by using a pulse code modulation (PCM) method to be converted into a data bit string and to be loaded on the payload when a call is actually performed through the VoIP network.

The multimedia quality measuring application 140 compares the loopback sample multimedia data looped back with the loopback sample multimedia data so as to measure the quality. That is, by analyzing the header and payload of a loopback packet received, the packet loss, the delay, and/or the jitter are calculated to measure the quality.

The packet loss ratio measurement is performed by comparing the loopback sample multimedia data looped back with the original sample multimedia data transmitted to the server. For instance, when the number of packets of the original sample multimedia data is 20 but the number of the packets of the loopback sample received from the VoIP multimedia sever is only 15, it may be determined that 5 packets are lost.

In order to determine the packet delay and jitter, the time stamp in the header of the packet of the loopback sample multimedia data received from the VoIP multimedia server 200 and the time stamp of voice data in the payload are analyzed. A result of the analysis is applied for measuring the quality.

After measuring the quality as described above, the header of the RTP packet is analyzed to detect a terminal IP and find sections to the terminal IP. Then, for each section, the packet loss, the delay, and/or the jitter are determined. By determining the packet loss, the delay, and/or the jitter for each section with reference to the terminal IP in the header, the transmission quality may be measured for each section of the VoIP network. Values of the measured voice quality and packet transmission quality are classified according to time and section so that a network section where the voice quality is degraded is detected with respect to time and section, thereby improving efficiency of voice quality measurement.

The multimedia quality measuring application 140 transmits the result of the quality measurement to the VoIP multimedia server 200. Further, the multimedia quality measuring application 140 may load information about signal strength of Wi-Fi on the payload region to transmit the information. When the multimedia terminal 100 uses the Wi-Fi, information on the signal strength of the Wi-Fi is loaded on the payload region to be transmitted so that the VoIP multimedia server 200 analyzes a Wi-Fi reception environment of the corresponding multimedia terminal 100 and provides a result of the analysis to the multimedia terminal 100.

The display unit 170 may be, for example, a liquid crystal display device, which displays an image signal on a screen and also displays user data. The display unit 170 displays the result of the quality measurement received from the VoIP multimedia server 200 on the screen. FIG. 4 is a diagram exemplarily illustrating the display of the quality measurement result received from the VoIP multimedia server 200. As shown, results of the measurement of QoS items such as the loss, the jitter, the delay, and the means opinion score (MOS) of the multimedia data which have passed through the VoIP network are displayed so that the user of the multimedia terminal 100 may be notified of the measurement result.

Figure 5:
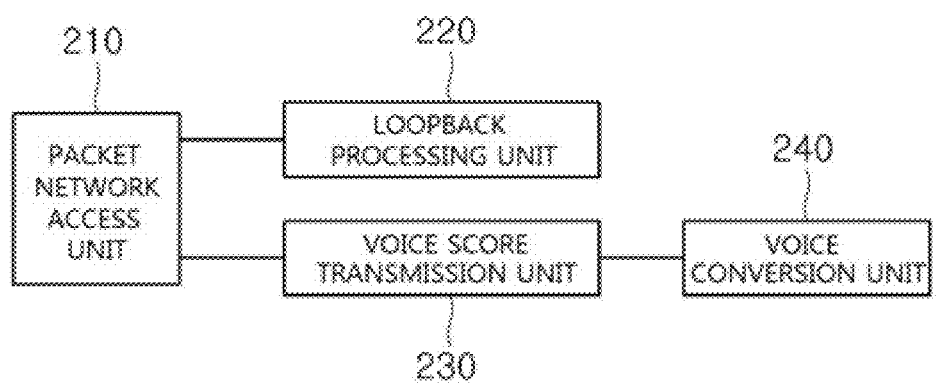
FIG. 5 is a block diagram illustrating a structure of a VoIP multimedia server according to an embodiment of the present invention.

FIG. 5 is a block diagram illustrating a structure of the VoIP multimedia server 200 according to an embodiment of the present invention.

The VoIP multimedia server 200 includes a packet network access unit 210, a loopback processing unit 220, a voice score transmission unit 230, and a voice conversion unit 240.

The packet network access unit 210 provides a protocol and hardware for access to the packet network such as the IP network in order to provide the VoIP service. Therefore, the packet network access unit 210 has a transmission module for IP packet conversion according to a protocol and a reception module for extracting data from the IP packet. The data processing unit 120 performs data operations such as analog-to digital (A/D) conversion, digital-to-analog (D/A) conversion, and coding to the packet processed in the packet network access unit 210.

The loopback processing unit 220 receives the sample multimedia data from the multimedia terminal 100 via the packet network and transmits the loopback sample multimedia data obtained by looping back the received sample multimedia data to the multimedia terminal 100. By looping back the received sample multimedia data, the quality measurement may be performed in the multimedia terminal 100.

The voice score transmission unit 230 converts the quality measurement result received from the multimedia terminal 100 into the quality measurement score and converts the score into voice data to transmit the data to the multimedia terminal 100. The quality measurement score may be calculated by using various methods. For instance, an average of values of the QoS items such as the packet loss, the delay, and the jitter is calculated, and a score is determined according to a location of distribution to which the average belongs. For example, the optimal measurement result may have a score of 5 on the assumption that a perfect score is 5.

The voice conversion unit 240 converts the quality measurement score into the voice data and provides the voice data to the voice score transmission unit 230. The voice conversion unit 240 generates a voice according to the received quality measurement score. The voice conversion unit 240 stores individual recorded files of scores, combines the individual recorded files so as to correspond to the quality measurement score, and converts the quality measurement score into the voice data.

For instance, numbers are previously recorded as voices in order to reproduce a corresponding voice according to the measurement score. For instance, numbers of 0 to 5 are previously recorded as voices (recorded file 1, example: one, two, three, four, etc.) and numbers of 0.01 to 0.99 are previously recorded (recorded file 2, example: point zero one, point zero two, etc.). In this state, when the measurement score is calculated as 4.52, the previously recorded files 1 and 2 are combined in order to convert the measurement result into a voice (example: "The quality measurement result is four point five two").

As described above, the generated measurement score voice is transmitted to the multimedia terminal 100 in the format of a voice packet so as to be received and reproduced by the multimedia terminal 100. Therefore, the user may know the quality measurement result.

Figure 6:
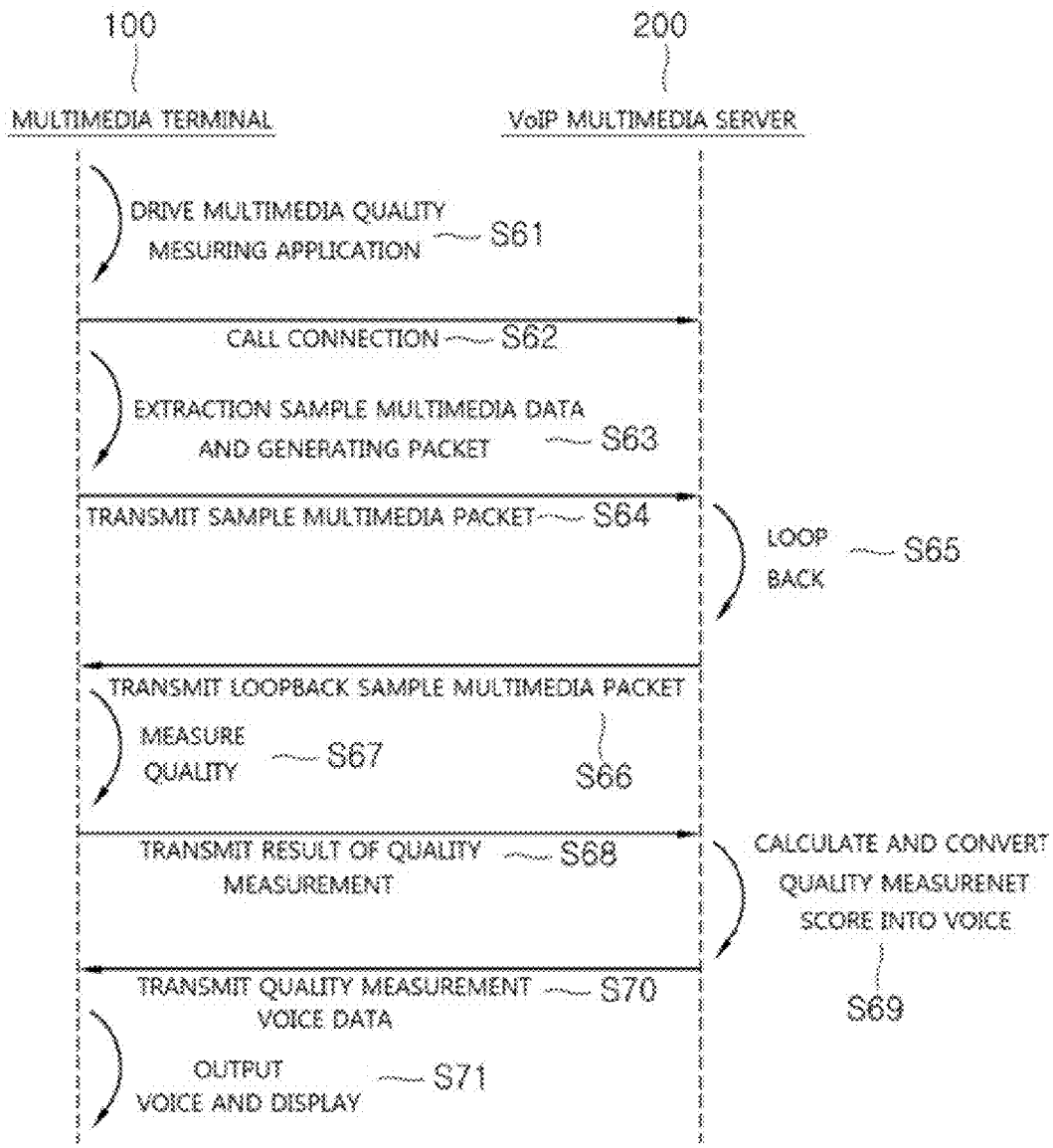
FIG. 6 is a flowchart illustrating a process of measuring quality of multimedia of a VoIP network according to an embodiment of the present invention.

FIG. 6 is a flowchart illustrating a process of measuring the quality of the multimedia service according to an embodiment of the present invention.

The multimedia quality measuring application 140 is driving in the multimedia terminal 100 in operation S61. The multimedia quality measuring application 140 transmits the sample multimedia data such as the voice data and image data to the VoIP multimedia server 200 and measures the quality of data looped back. The multimedia quality measuring application 140 may be installed in the multimedia terminal 100 when the multimedia terminal 100 is manufactured, or may be purchased by a user in an application market to be installed.

When the multimedia quality measuring application 140 is driven, the multimedia quality measuring application 140 tries to connect a call to the VoIP multimedia server 200 and connects the call thereto in operation S62. Herein, the multimedia quality measuring application 140 of the multimedia terminal 100 has an IP address of the VoIP multimedia server 200, and is thus capable of connecting the call.

When the call connection is successfully completed, the multimedia terminal 100 extracts the sample multimedia data from the sample multimedia DB in operation S63. The sample multimedia data such as the voice data and image data used for measuring the quality of the VoIP network are to be transmitted to the VoIP multimedia server 200.

The extracted sample multimedia data are stored in the payload region of the RTP packet so that the RTP packet is generated in operation S63. Referring to FIG. 3 which illustrates the RTP packet, in the header region of the RTP packet, header information of the packet is included, i.e., the sequence number, the source identifier, and the destination identifier are included. The unique serial number of the corresponding packet is included in the sequence number, and the transmission time is included in the time stamp. These pieces of information are used later when the packet loss ratio or delay ratio is measured. The source identifier corresponds to the IP address of the multimedia terminal 100, and the destination identifier corresponds to the IP address of the VoIP multimedia server 200 for receiving the RTP packet.

In the payload region, the sample multimedia data which are to be used for measuring the voice quality of the VoIP network are included. In the case where the sample multimedia data are voice data, the voice of the caller is sampled by using the PCM method to be converted into the data bit string and to be loaded on the payload when the call is actually performed through the VoIP network.

The sample multimedia packet of the generated RTP packet is transmitted to the VoIP multimedia server 200 in operation S64.

The VoIP multimedia server 200 loops back the received sample multimedia data in operation S65, and transmits the loopback sample multimedia data to the multimedia terminal 100 in operation S66.

The multimedia terminal 100 analyzes the received loopback sample multimedia data to measure the quality in operation S67. That is, by analyzing the header and payload of the loopback sample multimedia packet received, the packet loss, the delay, and/or the jitter are calculated to measure the quality.

The packet loss ratio measurement is performed by comparing the loopback sample multimedia data looped back with the original sample multimedia data transmitted to the server. For instance, when the number of packets of the original sample multimedia data is 20 but the number of the packets of the loopback sample received from the VoIP multimedia sever is only 15, it may be determined that 5 packets are lost.

In order to determine the packet delay and jitter, the time stamp in the header of the packet of the loopback sample multimedia data received from the VoIP multimedia server 200 and the time stamp of voice data in the payload are analyzed. A result of the analysis is applied for measuring the quality.

After measuring the quality as described above, the header of the RTP packet is analyzed to detect a terminal IP and find network sections to the terminal IP. Then, for each network section, the packet loss and delay are determined. By determining the packet loss and delay for each section with reference to the terminal IP in the header, the transmission quality may be measured for each section of the VoIP network. Values of the measured voice quality and packet transmission quality are classified according to time and section so that a network section where the voice quality is degraded is detected with respect to time and section, thereby improving efficiency of voice quality measurement. Further, by comparing the multimedia data, the quality is measured. Herein, in the case of the multimedia data, the QoS items including the packet loss, the delay, and/or the jitter are measured.

The quality measurement result may be in real time transmitted and reported to the server and another terminal. For instance, the quality measurement result is transmitted to the VoIP multimedia server 200 in operation S68. Herein, information about signal strength of Wi-Fi may also be stored in the payload region of the RTP packet. That is, when the multimedia terminal 100 uses the Wi-Fi, information on the signal strength of the Wi-Fi is loaded on the payload region to be transmitted so that the VoIP multimedia server 200 analyzes a Wi-Fi reception environment of the corresponding multimedia terminal 100 and provides a result of the analysis to the multimedia terminal 100.

The VoIP multimedia server 200 analyzes the quality measurement result for each user so as to make a list of multimedia terminal quality (quality measurement scores) of users. This multimedia terminal quality for each user may be read by a user itself or other users via a web.

Further, the VoIP multimedia server 200 analyzes the quality measurement result to calculate the quality measurement score, and converts the score into a voice in operation S69. For the QoS items such as the packet loss, the delay, and the jitter, the quality measurement score is generated based on the quality measurement result received. The quality measurement score may be calculated by using various methods. For instance, an average of values of the QoS items such as the packet loss, the delay, and the jitter is calculated, and a score is determined according to a location of distribution to which the average belongs. The optimal measurement result may have a score of 10 on the assumption that a perfect score is 10.

The calculated quality measurement score is converted into a voice in operation S69. That is, numbers are previously recorded as voices in order to reproduce a corresponding voice according to the measurement score. For instance, numbers of 0 to 9 are previously recorded as voices (recorded file 1, example: one, two, three, four, etc.) and numbers of 0.01 to 0.99 are previously recorded (recorded file 2, example: point zero one, point zero two, etc.). In this state, when the measurement score is calculated as 4.52, the previously recorded files 1 and 2 are combined in order to convert the measurement result into a voice (example: "The quality measurement result is four point five two").

The converted measurement score voice is converted into voice data to be transmitted to the multimedia terminal 100 in operation S70, and the quality measurement result is also stored in the VoIP multimedia server 200.

The multimedia terminal 100 decodes the measurement score voice data received and outputs a voice in operation S71. Further, as illustrated in FIG. 4, the quality measurement result is displayed so that the user may intuitionally know the quality measurement result.

According to an embodiment of the present invention, any user who carries a multimedia terminal 100 (smartphone) can easily measure the VoIP multimedia quality by using the multimedia terminal 100 without using additional device. Further, since it does not cost to measure the quality, the VoIP multimedia quality can be measured in a plurality of sections. Moreover, the quality can be bidirectionally measured in a loopback scheme by making a simple call.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for multimedia service quality measuring, the system comprising:
   a VoIP multimedia server that loops back sample multimedia data received from a multimedia terminal providing a VoIP multimedia service, analyzes a quality measurement result received from the multimedia terminal, calculates a quality measurement score, converts the quality measurement score into voice data, and transmits the voice data to the multimedia terminal; and
   the multimedia terminal that transmits the sample multimedia data to the VoIP multimedia server via a packet network, measures the quality of loopback sample multimedia data looped back from the VoIP multimedia server, transmits the quality measurement result to the VoIP multimedia server, receives the voice data of the quality measurement score, and outputs a voice;
   wherein the VoIP multimedia server comprises:
   a packet network access unit that performs transmitting and receiving operations for the packet network;
   a loopback processing unit that receives the sample multimedia data from the multimedia terminal via the packet network and transmits, to the multimedia terminal, the loopback sample multimedia data obtained by looping back the sample multimedia data received;
   a voice score transmission unit that converts the quality measurement result received from the multimedia terminal into the quality measurement score, converts the quality measurement score into the voice data, and transmits the voice data to the multimedia terminal; and
   a voice conversion unit that converts the quality measurement score into the voice data and provides the voice data to the voice score transmission unit.

2. The system of claim 1, wherein the voice conversion unit stores scores as individual recorded files, and combines the individual recorded files to correspond to the quality measurement score for the conversion into the voice data.

3. The system of claim 1, wherein the multimedia terminal comprises:
   an RF unit that increases/decreases and amplify a frequency transceived;
   a data processing unit that modulates and demodulates a signal transceived through the RF unit in a format of packet data;
   a multimedia processing unit that converts the packet data transceived through the data processing unit into multimedia data;
   a sample multimedia database that stores the sample multimedia data;
   a multimedia quality measuring application that, in response to a quality measurement request, transmits the sample multimedia data to the VoIP multimedia server via the packet network, measures the quality of the loopback sample multimedia data looped back, transmits the quality measurement result to the VoIP multimedia server, and outputs the voice data of the quality measurement score received from the VoIP multimedia server; and a memory in which the multimedia quality measuring application is installed.

4. A method for measuring multimedia service quality, the method comprising:

connecting a call to a VoIP multimedia server connected to a packet network by driving a multimedia quality measuring application by using a multimedia terminal;

transmitting sample multimedia data to the VoIP multimedia server by using the multimedia terminal;

transmitting loopback sample multimedia data obtained by looping back the sample multimedia data to the multimedia terminal by using the VoIP multimedia server;

measuring quality of the loopback sample multimedia data and transmitting a result of the quality measurement to the VoIP multimedia server by using the multimedia terminal;

analyzing the quality measurement result, calculating a quality measurement score, converting the quality measurement score into voice data, and transmitting the voice data to the multimedia terminal by using the VoIP multimedia server;

outputting the quality measurement score represented by the voice data as a voice by using the multimedia terminal, wherein multimedia terminal quality, of each user, analyzed by the VoIP multimedia server is read via a web.

5. The method of claim 4, wherein the sample multimedia data are compared with the loopback sample multimedia data to measure the quality.

6. The method of claim 5, wherein a terminal IP is extracted from data by a scope of measurement to detect a network section, and multimedia data are compared to measure the quality and display the quality measurement result for each section.

7. The method of claim 5, wherein loss and delay in a network section are measured, and QoS items including packet loss, delay, and jitter are measured in the case of multimedia data.

8. The method of claim 5, wherein the quality measurement result is transmitted to the VoIP multimedia server and another terminal in real time.

9. The method of claim 4, wherein prestored individual recorded files of respective scores are combined with each other to convert the quality measurement score into the voice data and transmit a result of the conversion as a voice.

10. The method of claim 4, wherein information about signal strength of Wi-Fi is transmitted together with the quality measurement result to the VoIP multimedia server when the multimedia terminal is connected through the Wi-Fi.

* * * * *